United States Patent [19]
Moore et al.

[11] 3,714,479
[45] Jan. 30, 1973

[54] CONTROL ROD DRIVE MECHANISM

[75] Inventors: Wesley D. Moore, Palos Verdes Estates; Silveus M. Baker, Tustin, both of Calif.

[73] Assignee: Royal Industries, Inc., Pasadena, Calif.

[22] Filed: Nov. 13, 1970

[21] Appl. No.: 89,174

Related U.S. Application Data

[63] Continuation-in-part of Ser. No. 840,451, July 9, 1969, abandoned.

[52] U.S. Cl............................................310/80, 310/83
[51] Int. Cl...............................................H02k 7/12
[58] Field of Search..........310/83, 67, 74, 75, 80, 12; 176/36

[56] References Cited

UNITED STATES PATENTS 2,812,455   11/1957   Noe.........................................310/83
2,857,537   10/1958   McCown..................................310/83

*Primary Examiner*—D. F. Duggan
*Attorney*—Christie, Parker & Hale

[57] ABSTRACT

A control rod drive mechanism for a nuclear reactor including means for preventing the excessive compressive loading of the control rod by the control rod drive motor. The drive motor is constructed with a "floating" rotor assembly for allowing it to translate upwardly in response to a compressive overload. The rotor is defined as comprising two pivoted segments with one of the rotor segments adapted for engaging a stop provided for the pressure housing of the control rod drive mechanism. When a compressive overload occurs, the rotor translates until the housing stop and rotor interengage so that the rotor torque is transferred from the control rod to the pressure housing. A compressive overload condition exists whenever the friction loading exceeds the combined weight of the control rod and associated components.

10 Claims, 7 Drawing Figures

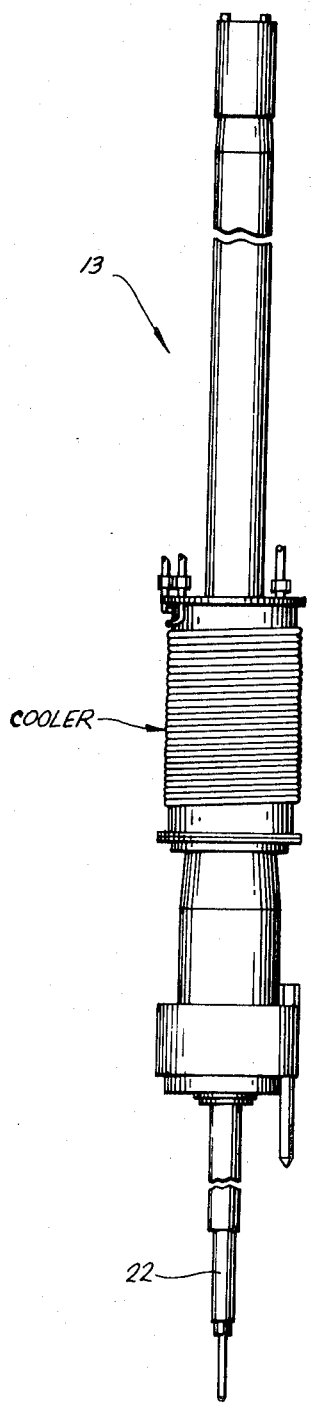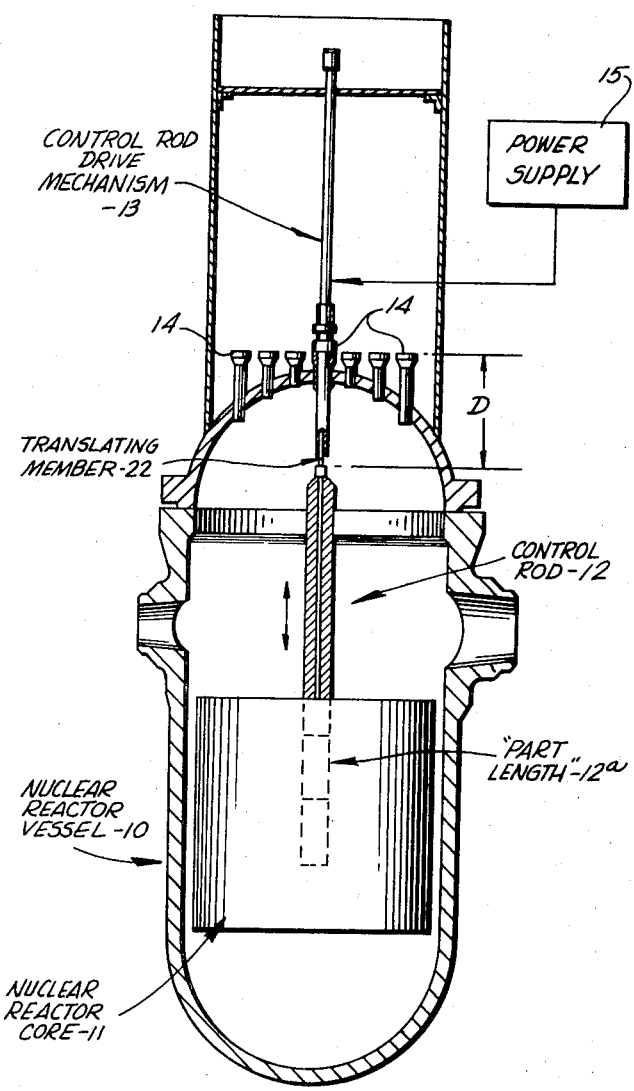
Fig. 2
Fig. 1
INVENTOR.
SILVEUS M. BAKER
WESLEY D. MOORE

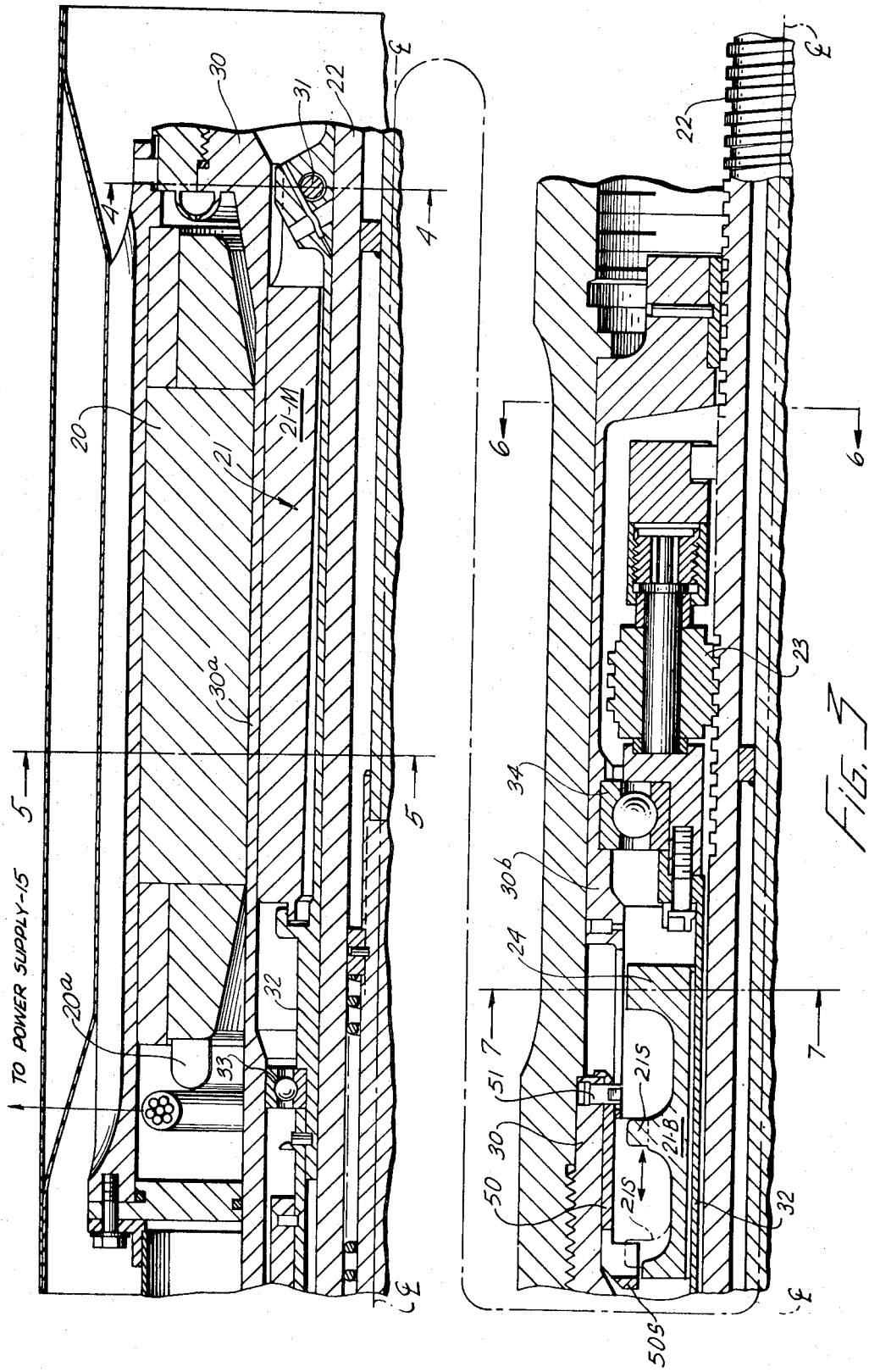

CONTROL ROD DRIVE MECHANISM

This application is a continuation of our earlier filed application bearing Ser. No. 840,451, now abandoned, and assigned to the same assignee as the present application.

This application is related to the copending application bearing Ser. No. 833,377 and now U.S. Pat. No. 3,619,675 granted on Nov. 9, 1971, and assigned to the same assignee as the present invention.

This invention relates to a control rod drive mechanism for a nuclear reactor.

Control rod drive mechanisms are utilized in nuclear reactors to control the position of the control rod within the reactor core and thereby control the nuclear reaction. Various types of control rod drive mechanisms have been employed for this purpose. In addition to the actual positioning of the control rod at a desired location within the reactor core, the drive mechanisms are generally operative for moving the control rod in and out of the reactor core at controlled speeds. For example, when the power is lost to the control rod drive mechanism it may be necessary to insert as quickly as possible the control rod into the reactor core to prevent any undesirable reactions as a result of the loss of power. Any control rod drive that affords this action is termed in the art as a "scram" drive mechanism. One such drive is exemplified by the teachings of U. S. Pat. No. 2,857,537. Generally, this type of drive is employed with control rods that have a poison (neutron absorber) section for a substantial portion of the rod so that upon positioning of the rod varying lengths of the poison portion of the rod are immersed in the reactor core thereby varying the nuclear reactivity. Another type of control rod presently employed is termed in the art as a "part length" control rod. The part length control rod is distinguished from the conventional rod in that only a portion of the rod contains poison for controlling the nuclear reaction. This part length control rod has been found to allow for better control over nuclear reactivity within the reactor core. With this type of control rod, it may not be necessary to provide a "scram" action.

In both of the aforementioned types of drive mechanisms, it is desirable to provide means for preventing any possibility of overload to the reactor control rod due to compression loading as a result of the control rod becoming stuck when driving in or during an interval when the control rod reaches the bottom of the reactor core as the result of an overdrive condition.

The present invention provides an improved control rod drive mechanism particularly useful to prevent any possible damage to the translating member or leadscrew and reactor control rod due to compression loading through the provision of a floating rotor assembly. The rotor assembly is defined to move along the translating member to prevent a compressive load on a control rod.

These and other features of the present invention may be more fully appreciated when considered in the light of the following specification and drawings, in which:

FIG. 1 is a diagrammatic cross-sectional view of a nuclear reactor vessel embodying the present invention;

FIG. 2 is a detached view of the control rod drive mechanism illustrated in FIG. 1;

Figure 5:
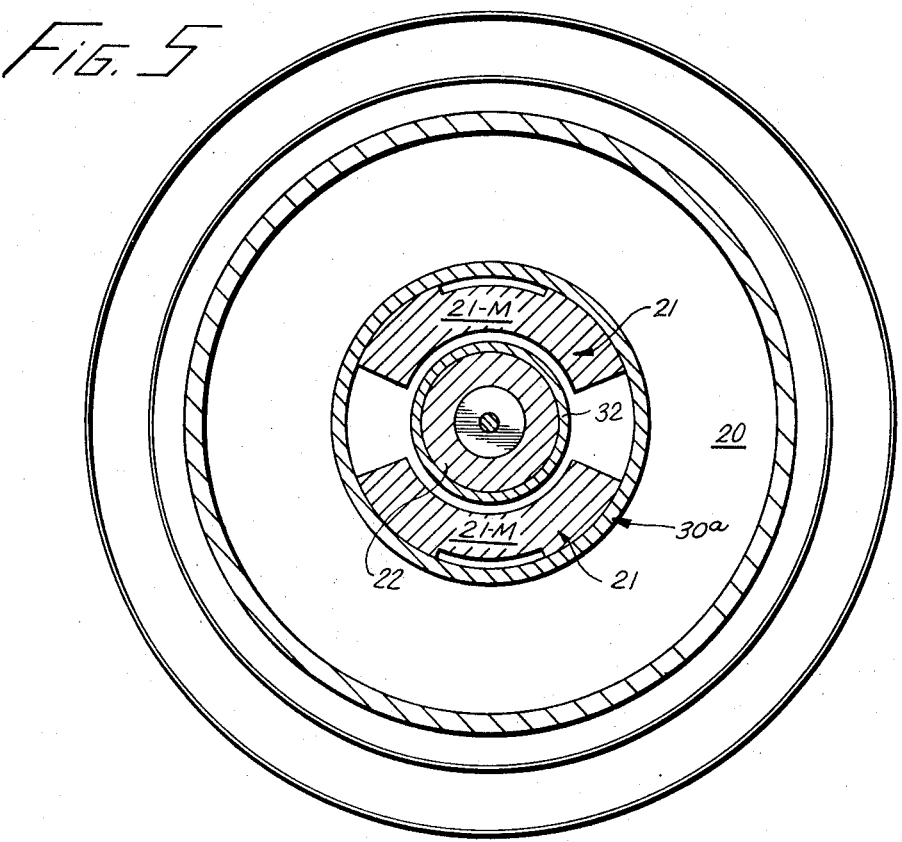
Figure 4:
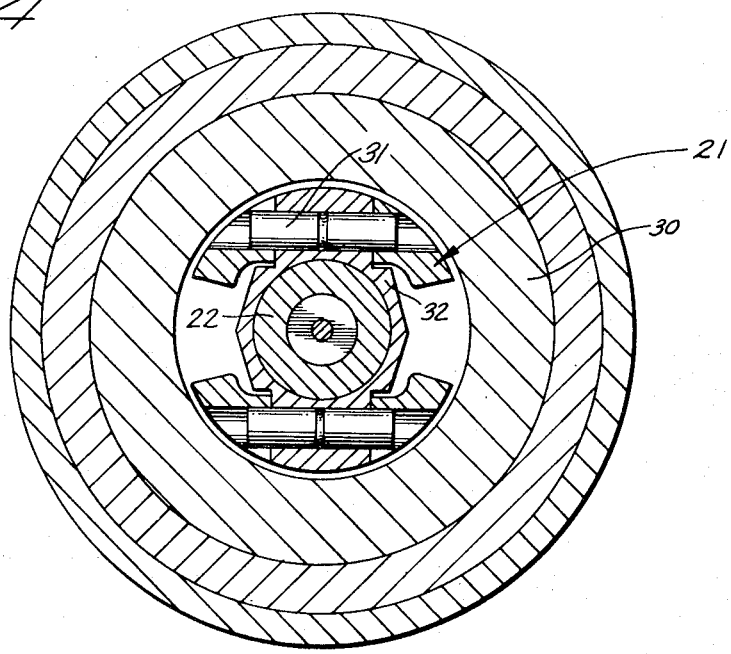
Figure 6:
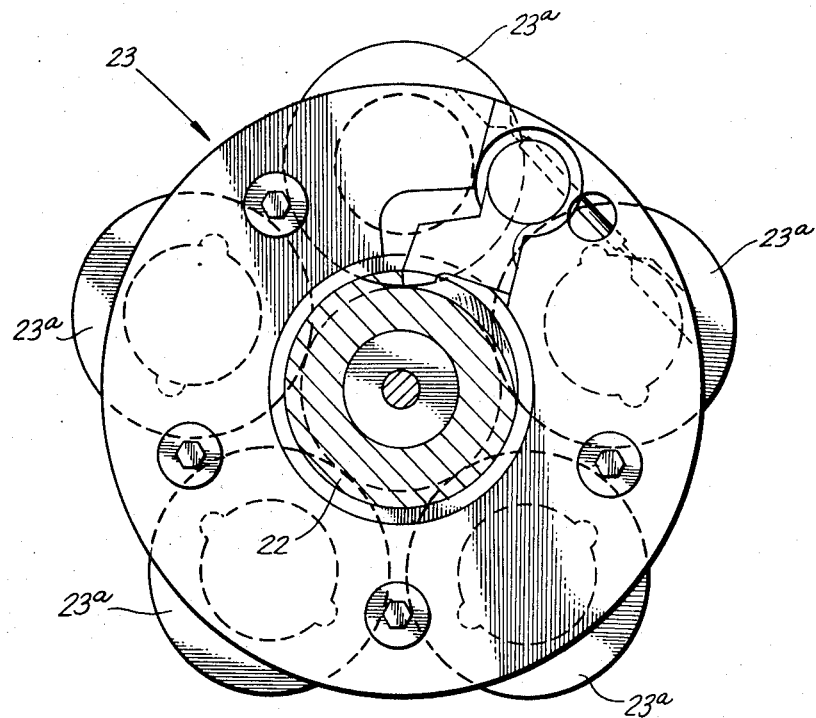
Figure 7:
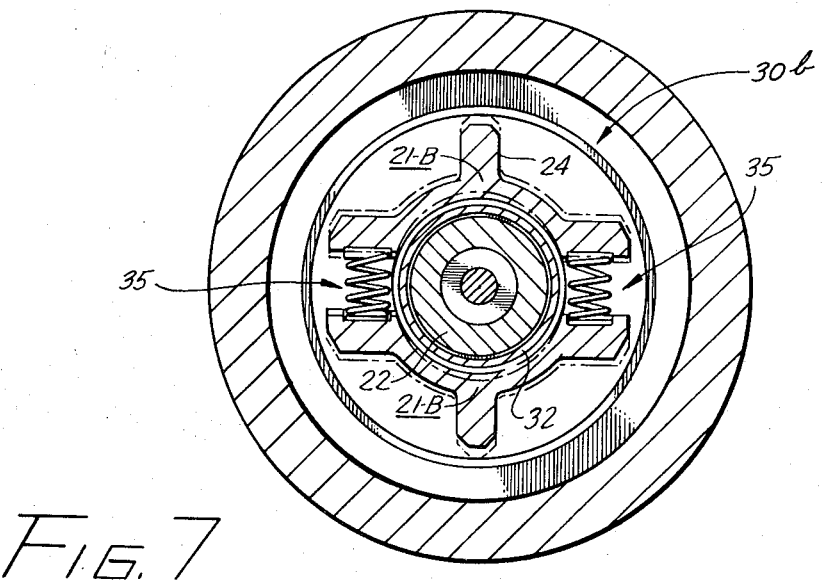

FIG. 3, in its entirety, is a partial cross-sectional view of the control rod drive mechanism of the present invention illustrated on one side of the center line for the mechanism and is an electrically energized condition;

FIG. 4 is a cross-sectional view taken along the line 4—4 of FIG. 3;

FIG. 5 is a cross-sectional view taken along the line 5—5 about the pivot point of the rotor assembly as illustrated in FIG. 3;

FIG. 6 is a cross-sectional view of the roller-nut assembly taken along the line 6—6 of FIG. 3; and FIG. 7 is a cross-sectional view of the braking means taken along the line 7—7 of FIG. 3.

Now referring to FIGS. 1 and 2 the general organization of a conventional nuclear reactor vessel will first be examined. The nuclear reactor vessel is identified by the general reference character 10. The vessel 10 comprises a nuclear reactor core 11 which receives a control rod 12. The control rod 12 is illustrated as a "part length" rod and the poison portion is identified by the reference character $12^a$. The position of the control rod 12 is controlled through the action of the control rod drive mechanism 13 which is axially mounted above the control rod 12. The control rod drive mechanism 13 is connected to the control rod 12 through a nozzle 14 extending outwardly of the reactor vessel 10 proper. Although one control rod drive mechanism 13 is illustrated in association with a single control rod 12, it will be understood that a plurality of such mechanisms are generally employed and will be mounted in the same fashion with the illustrated nozzles of FIG. 1. Each of the other unillustrated control rods 12 will have an independently operated control rod drive mechanism 13 for positioning the control rods into the nuclear reactor core 11 to effect the desired nuclear reaction by positioning the rods 12. As will be evident from FIG. 1, the linear movement of the control rod drive mechanism and thereby the total travel of the control rod 12 is identified in FIG. 1 by the linear distance "D," essentially extending between the outer portion of the nozzles 14 and the point of junction between the control rod 12 and the control rod drive mechanism 13. For the purpose of effecting the positioning of the control rod 12, a control rod power supply is generally coupled to the motor for effecting the linear movement of the control rod 12. The power supply is illustrated in FIG. 1 in block form and identified by the reference numeral 15.

Now referring to FIGS. 3 through 5 the detailed construction of the control rod drive mechanism 13 of the present invention will be examined. Although the present invention is embodied in a structure for a "part length" control rod and will be described in such an environment, it will be recognized that the invention is equally applicable to a "scram" control rod. It will be recalled that the illustration of the control drive mechanism in FIG. 3 is on one side of the centerline and the unillustrated other half is the same as that illustrated. Broadly, the control rod 12 is controlled by the provision of a motor having a stator adapted for generating a moving or rotating magnetic field upon energization of the stator windings for effecting the linear drive action. The moving or rotating magnetic field is coupled to the motor rotor 21 that moves or rotates in response to the magnetic field. The rotor 21 is adapted for controlling a translating means or member shown in the form of a leadscrew 22 connected to the control rod 12. With the energization of the stator 20, the rotation of the rotor 21 causes the translation of the leadscrew 22 as a result of the engagement of a roller nut assembly 23 secured to the rotor and positively connected to the leadscrew 22. In addition, the control rod drive mechanism includes braking means generally identified by the reference numeral 24. It should be recognized that the position of the drive mechanism illustrated in FIGS. 3–7 is the position that corresponds to the intervals when the stator 20 is energized. In this position then the braking means 24 is de-energized from its normal position for providing the braking action.

The control rod drive mechanism 13 is mounted with a pressure housing 30 longitudinally extending for enclosing the mechanism. The pressure housing 30 is constructed and defined in the fashion of a sleeve and has a magnetic section 30$^a$ for coupling the magnetic field generated by the motor stator 20 to the rotor 21 therethrough. It should be understood that the motor comprising the stator 20 and the rotor 21 is of a generally conventional construction and may comprise a four-pole, six-phase reluctance type stepping motor. A motor of this type is disclosed in the aforementioned U. S. Pat. No. 2,857,537. For this purpose the motor stator 20 will have an energizable winding 20$^a$ for connection to the power supply 15. The power supply 15 is connected and defined for energizing the stator windings 20$^a$ in the proper sequence for generating a rotating magnetic field. For this purpose the power supply may be a D.C. power supply wherein two electrical cycles result in one revolution of the rotor 21 and effects the translation of the leadscrew 22 through a preselected fraction of an inch. It will also be appreciated that the direction of the movement or rotation of the magnetic field establishes the direction of the movement or rotation of rotor 21 and thereby the direction of movement of the control rod 12 into and out of the nuclear core 11 whereby the active segment 12$^a$ is positioned in different locations in the reactor core 11. The stator 20 is mounted on the outside of the housing 30 adjacent the magnetic portion 30$^a$ while the rotor 21 is mounted within the pressure housing opposite the stator to be responsive to the rotating magnetic field produced by the stator 20.

The rotor 21 in accordance with the present teachings is of a unitary construction and is considered as being defined in two pivoted segments. One rotor segment is illustrated as the magnetic segment of the rotor 21 and is mounted immediately opposite the stator 20 and is identified by the reference character 21-M. The other rotor segment 21-B is mounted on the opposite side of a pivot pin 31, shown at the right hand section of the upper portion of FIG. 3, and is identified by the general reference numeral 21-B. This rotor section 21-B is illustrated in the left-hand portion of the lower section of FIG. 3. The two rotor segments 21-M and 21-B are pivotable about the pin 31 in opposite directions. As illustrated, the rotor section 21-M is in engagement with the rotor tube 32 mounted to be rotatable therewith. The rotor 21 and rotor tube 32 are suspended between a radial bearing 33 and a thrust bearing 34 to be rotatable therebetween. The pressure housing 30 houses the upper portion 21-M of the rotor 21 and serves as a guide for the upper end of the leadscrew 22. The upper end of the rotor tube 32 is adapted for supporting the rotor radial bearing 33 on which the rotor 21 and rotor tube 32 rotate. The rotor segment 21-B includes spring means for moving the rotor segment 21-B or the braking segment towards the housing 30-B which is restrained rotationally by lock pin 51 to the pressure housing 30 when the stator is de-energized. The spring means are identified by the general reference character 35. The braking element 24 can be adapted for providing an absolute mechanical lock with the adjacent wall of the housing 30-B or can be adapted to provide a frictional lock to the wall of the housing 30-B. The braking position, or the other position from that illustrated in FIG. 3 in response to the urging of the spring means 35 is illustrated in dotted outline in FIG. 7.

The rotor tube 32 encloses the leadscrew 22 arranged coaxial with the rotor tube. The leadscrew 22 is connected with the rotor 21 through a roller nut assembly 23. The roller nut assembly 23, as best illustrated in FIG. 6, comprises a plurality (illustrated as five) of roller nuts 23$^a$ in positive engagement with the leadscrew 22. It will be appreciated that the lower end of the leadscrew 22 is coupled to the control rod 12 as illustrated in FIG. 1 so that the translation of the leadscrew as a result of the rotation of the roller assembly 23 effects the desired linear position of the control rod 12.

With the above structure in mind, then, it will be recognized that with the power supply 15 de-energized that the stator 20 will be de-energized and that the rotor 21 will be in a stationary position. With the rotor 21 in a stationary position, the motor segment 21-B will be braked against the inner wall of the housing 30-B as a result of the braking section 21-B being urged thereagainst by the spring means 35. At this same time the roller assembly 23 will positively engage the leadscrew 22 to prevent any movement in either direction of the leadscrew 22. At this time the position of the rotor 21-M will be opposite to that illustrated in FIG. 3, namely, it will be spaced away from the pressure housing 30 and pivoted towards the rotor tube 32. With the energization of the motor stator 20, then, the rotating magnetic field will be generated as a result of the energization of the stator windings. The rotating magnetic field will be coupled through the magnetic portion 30$^a$ of the pressure housing 30 to the rotor magnetic segment 21-M. The rotor segment 21-M will immediately respond to the magnetic field and pivot about the pin 31 towards the stator 20 and away from the rotor tube 32. At this same interval the motor segment 21-B will pivot away from the housing 30-B thereby unlocking the rotor 21 and thereby the leadscrew 22. With the unlocking of the leadscrew 22 and the continuing energization of the stator 20, the rotor 21 will rotate in response to the rotating magnetic field and since the roller nut assembly 23 is carried by the rotor 21, the leadscrew 22 will be moved in accordance with the direction of the rotation of the rotating magnetic field. The leadscrew 22, then, essentially translates the rotary motion of the roller nut assembly 23 into linear motion and thereby linearly positions the control rod 12. With the clockwise rotation of the rotor 21, the leadscrew 22 is driven upwardly or out of the reactor core 11, while the counterclockwise rotation of the rotor 21 will drive the leadscrew 22 into the reactor core 11. It should now be appreciated that if during any positioning of the control rod 12 that the power from the power supply 15 is interrupted or there is a complete loss of power, the rotating magnetic field will suddenly collapse. With the construction of the present invention the position of the leadscrew 22 will be maintained or the leadscrew will stay put. The collapse of the magnetic field will cause the rotor segments 21–M and 21–B to pivot to their normal de-energized position whereby a braking force is applied as a result of the rotor segment 21–B engaging in a braking fashion the housing 30–B in response to the spring means 35. In addition, with the positive contact between the leadscrew 22 and the roller nut assembly 23, the position of the leadscrew is held and maintained until power is reapplied.

Now referring specifically to FIG. 3, the structure affording the load-limiting action will be examined in detail. This feature is embodied in the control rod by "floating" the rotor assembly 21 for allowing it to translate upwardly in response to a compressive overload. The rotor segment 21–B is adapted to coact with a down stop 50 having an abutment portion 50–S arranged adjacent the rotor segment 21–B for engaging the abutment 21–S for the section 21–B when it is caused to translate into rotational engagement with the portion 50–S of the down stop 50. These two elements do not engage one another except when an outward load is transmitted to the rotor 21 as a result of a compressive overload.

The down stop 50 is secured to the pressure housing portion 30 by means of a lock pin 51 which provides torque restraint for housing portion 30$^b$. It will be seen that the housing portion 30$^b$ extends around the downward side of the roller assembly 23 and abuts it so as to act as a guide for the leadscrew 22. Any stoppage of the control rod 12 as a result of excessive friction, interference, stuck rod, or a rod bottom condition will cause the rotor 21 to move along the leadscrew thereby removing all compression loading from the control rod, except as a result of gravity. When any of the aforementioned conditions results in the application of a compression load on the control rod 12, the load is transferred as a result of the provision of the floating rotor from the control rod 12 and/or the leadscrew 22 to the rotor segment 21–B. This causes the rotor section 21–S to translate upwardly while rotating to the position illustrated in dotted outline thereby engaging the rotational abutment portion 50–S of the down stop 50. With the interengagement of the portions 21–S and 50–S the rotor torque load is transferred from the leadscrew to the external mechanism supporting members. Also, during these intervals, the movement of the control rod 12 ceases. The movement of the rotor, as described, results whenever the friction loading exceeds the combined weight of the control rod 12, leadscrew 22 and the rotor assembly 21, the only limitation on the action.

what is claimed is:

1. In a nuclear reactor control rod drive mechanism, the improvement comprising
    means for linearly positioning a control rod in a nuclear reactor core,
    and means for preventing the excessive loading of the control rod by the first-mentioned means.

2. In a nuclear reactor control rod drive mechanism as defined in claim 1 wherein the second-mentioned means is responsive to a compressive loading of the control rod.

3. In a nuclear reactor control rod drive mechanism including
    a drive motor having a stator and a rotor adapted for linearly positioning a control rod in a nuclear reactor core,
    said rotor being adapted for linear motion towards and away from the reactor core and carrying a stop member, and
    means arranged adjacent the rotor constructed and defined for providing a rotor arresting action when the rotor is moved into engagement therewith.

4. In a nuclear reactor control rod drive mechanism as defined in claim 3 wherein the rotor is responsive to a preselected compressive load on the control rod to cause said rotor stop member to travel towards the rotor arresting member.

5. In a nuclear reactor control rod drive mechanism connectable to the control rod including
    a pressure housing, a motor having an energizable stator and a rotor,
    the stator having energizable windings constructed and defined for producing a rotating magnetic field and mounted adjacent a selected portion of the pressure housing,
    a rotor assembly carrying nut means rotatably mounted within the pressure housing and coupled to be rotatably responsive to the rotating magnetic field,
    translating means having a connection with the nut means to be responsive thereto for translating the rotary motion of the rotor to linear motion to thereby position the reactor control rod,
    said rotor assembly including braking means for restraining the translating means except when the motor stator is energized,
    and means for preventing the excessive loading of the control rod by the motor.

6. In a nuclear reactor control rod drive mechanism connectable to a control rod including
    a pressure housing having a magnetic section,
    a motor having an energizable stator and a rotor,
    the stator being adapted for producing a rotating magnetic field and being mounted adjacent the magnetic section of the housing for coupling the magnetic field therethrough,
    a rotatable rotor tube positioned within the rotor,
    the rotor for the motor being mounted inside the pressure housing and rotatably mounted with the rotor tube to be rotatable responsive therewith to the magnetic field coupled thereto and adapted to be moved linearly to prevent the compressive loading of the control rod and the like,
    a translating leadscrew movably mounted within the rotor tube,
    said rotor carrying a nut assembly for engagement with the leadscrew to cause the leadscrew to be responsive to the rotations of the rotor,
    said rotor further carrying braking means normally braking the rotor when the stator is de-energized for holding the translating leadscrew in position and dedactuated when the stator is energized.

7. In a nuclear reactor control rod drive mechanism as defined in claim 6 wherein the rotor comprises two pivoted segments adapted for pivoting in opposite directions in response to the energization and de-energization of the stator, said braking means being carried by one of said segments.

8. In a nuclear reactor control rod drive mechanism as defined in claim 7 wherein said rotor segments comprise a magnetic segment coupled to the rotating magnetic field and the other segment carrying the braking means, said braking means being constructed and defined to be normally biased in braking position against said housing.

9. In a nuclear reactor control rod drive mechanism as defined in claim 6 wherein said nut assembly comprises a plurality of spaced-apart roller nuts positively engaging the leadscrew for holding and maintaining the leadscrew position and thereby the position of the control rod in the event of power interruption or failure of power to the stator.

10. In a reactor control rod drive including a pressure housing, a motor stator assembly adapted for producing a rotating magnetic field surrounding the pressure housing, a rotor-nut assembly mounted within the pressure housing, a rotor tube rotatably mounted within the rotor assembly, a translating leadscrew mounted within the rotor tube to be responsive to the rotations of the rotor-nut assembly, a control rod connected to the leadscrew and moved therewith, said rotor-nut assembly comprising pivoted rotor segments adapted to pivot in opposite directions in response to the energization and de-energization of the stator assembly for providing an unlocking and locking action on the leadscrew respectively and being adapted for linear movement to prevent a preselected compressive load on the control rod and the like, said pressure housing including means arranged adjacent the rotor-nut assembly constructed and defined for providing a rotor arresting action when the rotor is moved into engagement therewith, one of said rotor segments carrying means coacting with said pressure housing means for arresting the rotor drive action when it is moved into engagement therewith in response to said compressive loading.

* * * * *